United States Patent [19]
Norton

[11] Patent Number: 5,808,837
[45] Date of Patent: Sep. 15, 1998

[54] DISK DRIVES

[75] Inventor: Kenneth Hamilton Norton, Edinburgh, United Kingdom

[73] Assignee: Myrica (UK) Limited, Fife, United Kingdom

[21] Appl. No.: 801,751

[22] Filed: Feb. 18, 1997

[30] Foreign Application Priority Data

Feb. 20, 1996 [GB] United Kingdom .................... 9603508

[51] Int. Cl.⁶ .............................. G11B 5/54; G11B 21/22
[52] U.S. Cl. ............................................................ 360/105
[58] Field of Search ............................................. 360/105

[56] References Cited

U.S. PATENT DOCUMENTS

| | | | |
|---|---|---|---|
| 4,684,913 | 8/1987 | Yaeger | 337/40 |
| 4,724,500 | 2/1988 | Dalziel | 360/103 |
| 5,463,514 | 10/1995 | Yaeger | 360/105 |
| 5,508,857 | 4/1996 | Horita | 360/105 |
| 5,640,289 | 6/1997 | Chamberlain | 360/105 |

FOREIGN PATENT DOCUMENTS 0 451 959 A2  10/1991  European Pat. Off. .

OTHER PUBLICATIONS

IBM Technical Disclosure Bulletin, vol. 38, No. 4, 1 Apr. 1995, pp. 327/328, "Head Loading Using Head Separator with Ramp Function".

Patent Abstracts of Japan, vol. 018, No. 330 (p. 1758), 22 Jun. 1994 & JP 06076506 A (Sony Corp), 18 Mar. 1994.

*Primary Examiner*—Robert S. Tupper
*Attorney, Agent, or Firm*—Ratner & Prestia

[57] ABSTRACT

Improvements relating disk drives, particularly but not exclusively removable cartridge, magnetic, hard disk drives, including:

(a) the use of a limit stop (16) to restrain the movement of a resiliently biased suspension arm 12, thereby allowing the disk drive to be used with disks having a range of thicknesses; and (b) the use of a memory actuation element which can be energised so as to move the read/write head clear of the disk surface during head loading and unloading, the memory actuation element comprising an element which is adapted to deform physically in response to an applied electric load or a change in temperature, such as a piezo ceramic element or shape memory alloy (SMA). The memory actuation element may be mounted on the suspension arm or on the limit stop and avoids the need for sliding contact with conventional head loading ramps.

17 Claims, 3 Drawing Sheets

DISK DRIVES

BACKGROUND OF THE INVENTION

Field of the Invention

The present invention concerns improvements in or relating to disk drives. More particularly, the invention relates to improvements in read/write head mounting and head load/unload arrangements for disk drives. The invention is particularly, but not exclusively, applicable to removable cartridge, magnetic, hard disk drives.

The advent of multimedia, and the ever increasing demands on computer disk drive manufacturers to supply hard disk drives with larger capacity and improved access times, has led to the development of removable hard diskette drives. Such devices allow hard disk cartridges to be removed from the drive and interchanged, but require dynamic head load and unload mechanisms to load and unload the read/write heads of the drive to and from the magnetic media.

Existing dynamic head load mechanisms have generally been developed for the purpose of increasing storage density (rather than to enable removable media), by reducing the texturing of the media to allow lower glide heights, and for reduced start-up torques for drive spindle motors. Many existing dynamic load mechanisms use "side lift" which results in torsional twist of the head suspension and additional head attitude biasing, giving rise to non-idealised head loading. These mechanisms also rely on sliding friction, which results in contamination. Such contamination can result in damage to the media and resultant loss of data or, in extreme cases, catastrophic failure of the head.

SUMMARY OF THE INVENTION

The present invention relates to improvements in disk drives including improved head suspension arrangements and dynamic load mechanisms, particularly for removable cartridge type disk drives. The invention is particularly applicable to inductive head devices, but can also be effectively applied to magnetoresistive devices, where the head is even more sensitive to contamination, resulting in thermal asparities.

In accordance with a first aspect of the invention, there is provided a disk drive comprising at least one read/write head mounted on a suspension arm, said suspension arm being mounted on an actuator arm whereby said read/write head may be translated parallel to a surface of a data storage disk, said suspension arm comprising a resilient member shaped such that said read/write head is biased towards said disk surface in a direction normal to said surface, wherein there is provided a limit stop member mounted on said actuator arm and adapted to limit the movement of said read/write head towards said disk surface.

Preferably also, said disk drive is a removable-cartridge-type hard disk drive adapted to receive interchangeable disk cartridges in which the thickness of the disk may vary from cartridge to cartridge.

The arrangement of said limit stop member is such that, for disks having a thickness greater than a predetermined minimum value, the read/write head will contact the disk surface, in use, prior to said suspension arm contacting said limit stop member, whilst for disks having a thickness less than or equal to said predetermined minimum value, said suspension arm will contact said limit stop member prior to said read/write head contacting the disk surface.

The disk drive may have a plurality of read/write heads mounted on a corresponding plurality of suspension arms, said suspension arms being mounted on a common actuator arm assembly and each having a limit stop member associated therewith. The heads may be arranged to cooperate with one or more surfaces of one or more disks as required.

Preferably, said limit stop member comprises a generally planar, C-shaped member disposed in a plane generally parallel to said disk surface and having a first limb secured to said actuator arm, a second limb extending from one end of said first limb along one side of said suspension arm and a third limb extending from an end of said second limb remote from said first limb to overlie said suspension arm on the side thereof upon which said read/write head is mounted, said third limb being contacted by said suspension arm in the absence of a disk having a thickness greater than said predetermined minimum value.

In a preferred embodiment of the invention, the disk drive includes a memory actuation element which can be energised so as to move the read/write head clear of the disk surface during head loading and unloading. As used herein, "memory actuation element" means any type of element which can be made to deform physically in response to an applied electric load or a change in temperature, such as a piezo ceramic element or shape memory alloy (SMA).

The memory actuation element may be mounted on a surface of the limit stop member or of the suspension arm such that, when energised, it deforms so as to force the suspension arm away from the disk surface. When mounted on the suspension arm, the memory actuation member may also function as a strain gauge and active damping element responsive to resonant vibration of the suspension arm.

In accordance with a second aspect of the invention, there is provided a disk drive comprising at least one read/write head mounted on a suspension arm, said suspension arm being mounted on an actuator arm whereby said read/write head may be translated parallel to a surface of a data storage disk, said suspension arm comprising a resilient member shaped such that said read/write head is biased towards said disk surface in a direction normal to said surface, wherein the disk drive includes a memory actuation element which can be energised so as to move the read/write head clear of the disk surface during head loading and unloading.

Preferably, said memory actuation element comprises an element which is adapted to deform physically in response to an applied electric load or a change in temperature, such as a piezo ceramic element or shape memory alloy (SMA).

Preferably also, said memory actuation element is mounted on a surface of said suspension arm such that, when energised, it deforms so as to force the suspension arm away from the disk surface.

Preferably also, said memory actuation element is adapted to function also as a strain gauge and active damping element responsive to resonant vibration of the suspension arm.

Embodiments of the invention will now be described, by way of example only, with reference to the accompanying drawings in which:

DESCRIPTION OF THE PREFERRED EMBODIMENTS

Figure 1A:
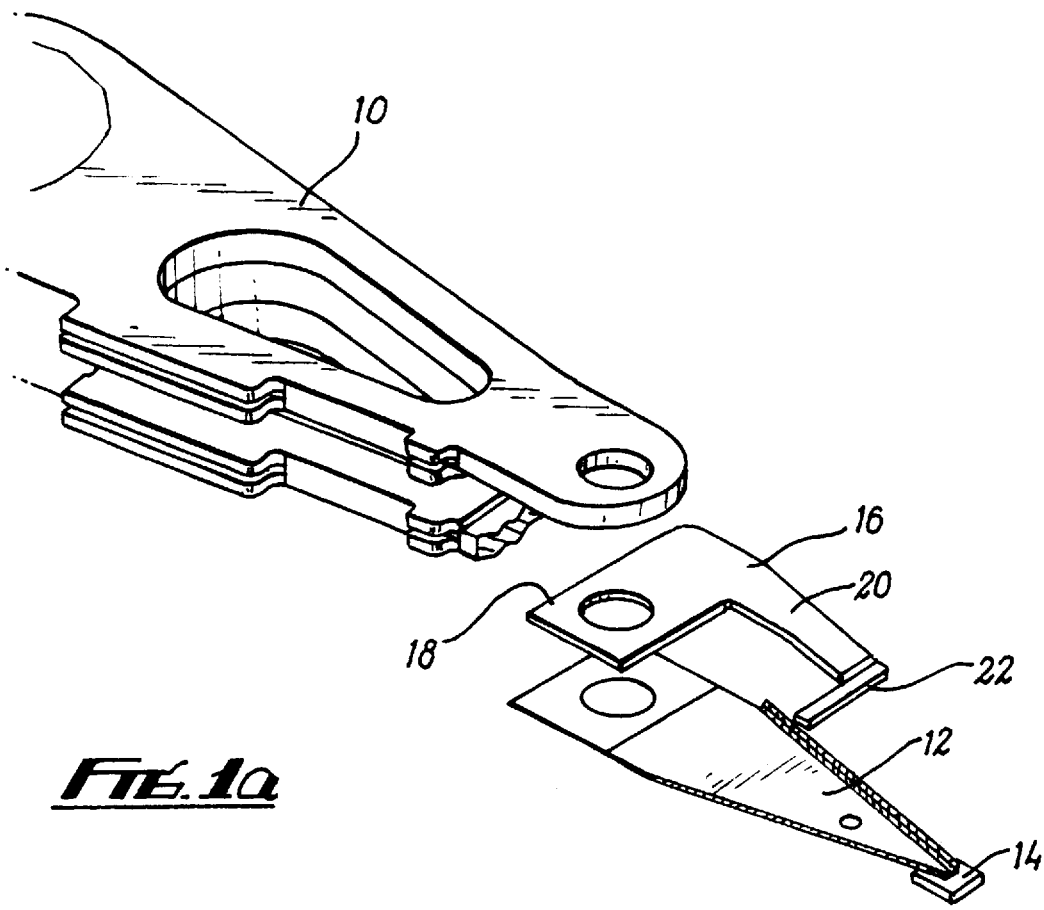
FIG. 1(a) is an exploded perspective view of an actuator arm, suspension and limit stop of a disk drive in accordance with the invention.

Referring now to the drawings, FIG. 1 shows the head mounting arrangement of a disk drive in accordance with the present invention. The arrangement comprises an actuator arm 10 upon which at least one suspension arm 12 is mounted, the or each suspension arm 12 having a read/write head 14 located at its outermost end. As is well known in the art, the actuator 10 is driven by any suitable means, such as a voice coil motor (not shown), in order to move the read/write head 14 parallel to the surface of a magnetic disk (not shown). This basic arrangement and functionality of a disk drive is well known and shall not be described or illustrated in greater detail herein. The present invention is particularly concerned with removable-cartridge-type disk drives, in which the disk is contained in an interchangeable cartridge. Again, drives of this type are well known and will not be described in detail herein.

The suspension arm 12 is resilient and is shaped so as to bias the read/write head 14 towards the surface of the disk in a direction normal to said surface. In a conventional disk drive, the suspension arm would be configured to suit a disk of known, fixed thickness, and would be arranged such that the read/write head is biased into contact with the disk surface, in use. With a removable-cartridge drive, the disks of different cartridges would normally also be of uniform thickness, typically 50 mil. However, in the case of a removable-cartridge drive it is possible to vary the capacity of the drive by varying the areal density or by varying the number of disk surfaces used or by combinations thereof. In a particular application, where reduced capacity results from the use of only a single disk surface, it may be possible to use media of varying thicknesses with the proviso that the disk surface used for data storage is set at the correct "z-height" (i.e. the vertical distance between the disk surface and a reference datum on the actuator assembly).

A conventional actuator assembly which is optimised for use with 50 mil media will not operate satisfactorily with thinner media. This is because the reduction in thickness of the disk results in an increased z-height, which results in instability of the head drag characteristic, a reduction in gram load and an increase in pitch offset angle. In the extreme, this will result in the head oscillating on the surface of the media with probable damage to the head mounting.

In accordance with the invention, the head mounting arrangement further includes a limit stop member 16, which limits the movement of the head 14 towards the disk surface as a result of the resilience of the suspension arm 12. The limit stop 16 can be arranged so that the head suspension operates as normal with a disk of a given thickness, e.g. 50 mil, but movement of the head is restrained to prevent contact with the surface of thinner disks. In the case referred to above, where media of differing thicknesses are used for "single surface" disks, the limit stop will intervene to prevent the head contacting the redundant surface.

Figure 1B:
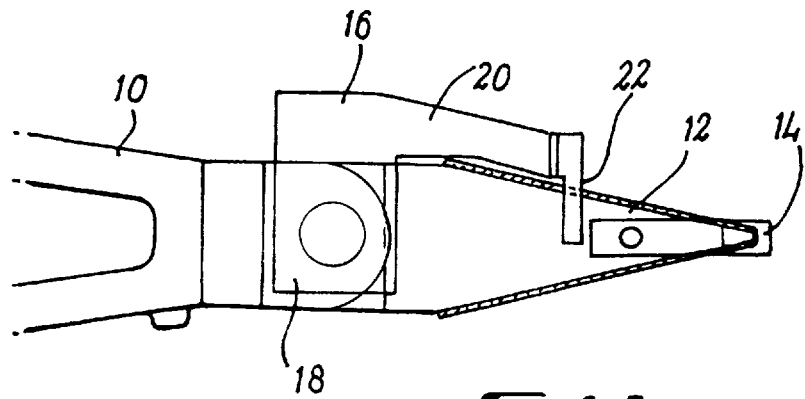
FIG. 1(b) is a plan view of the actuator arm, suspension and limit stop of Fig. 1(a)

As seen in FIG. 1, the limit stop member 16 comprises a generally planar, C-shaped member disposed in a plane generally parallel to the disk surface and having a first limb 18 secured to the actuator arm 10, a second limb 20 extending from one end of the first limb 18 along one side of the suspension arm 12 and a third limb 22 extending from an end of the second limb 20 remote from the first limb 18 to overlie the suspension arm 12 on the side thereof upon which the read/write head 14 is mounted (best seen in FIG. 1(b)). The arrangement is such that the third limb 22 is contacted by the suspension arm 12 in the absence of a disk having a thickness greater than a predetermined minimum value. The limit stop member 16 may be secured to the actuator arm by means of the same swage plate (not shown) which secures the suspension arm 12.

Figure 2A:
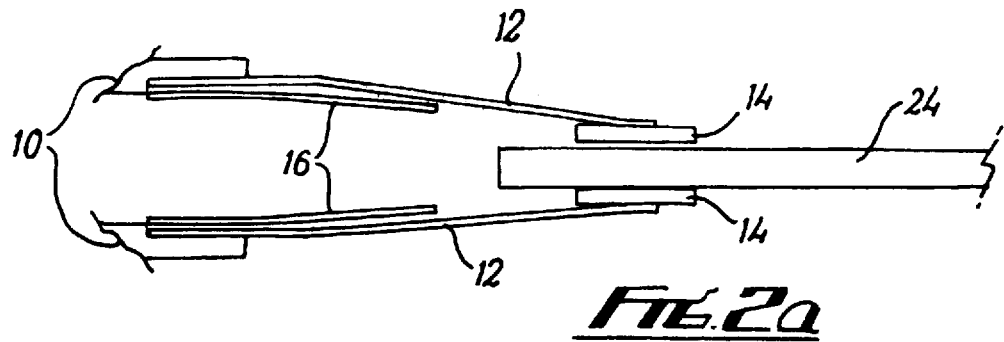
FIG. 2(a) is a schematic side view of the head assembly of a disk drive in accordance with the invention in use with a thin disk.
Figure 2B:
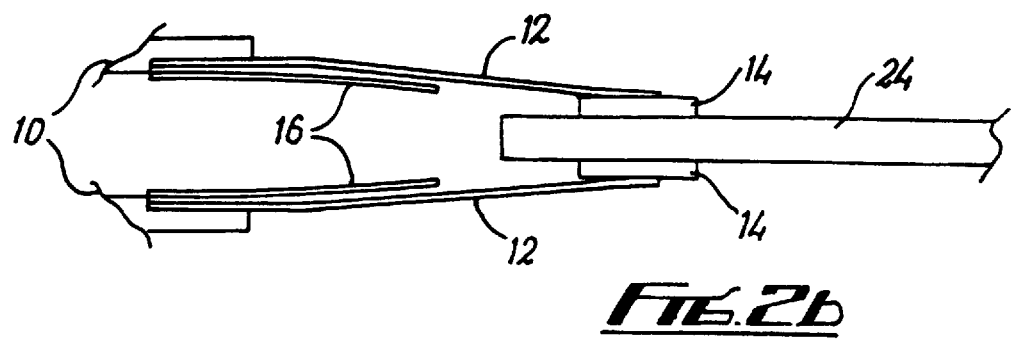
FIG. 2(b) is a schematic side view of the head assembly of a disk drive in accordance with the invention in use with a thick disk.

FIG. 2 illustrates the manner in which the head suspension arrangement cooperates with disks of different thicknesses. In this case, two heads 14 are mounted on a common actuator 10 facing opposite sides of a disk 24, as is well known in the art. In FIG. 2(a) a "thin" (31 mil) disk is installed and the suspension arms 12 contact the limit stop members 16, so that a clearance gap is maintained between the head 14 and the surface of the disk 24. In FIG. 2(b) a "thick" (50 mil) disk is installed and the heads 14 contact the disk surface before the suspension arms 12 contact the limit stop members 16.

Figure 3A:
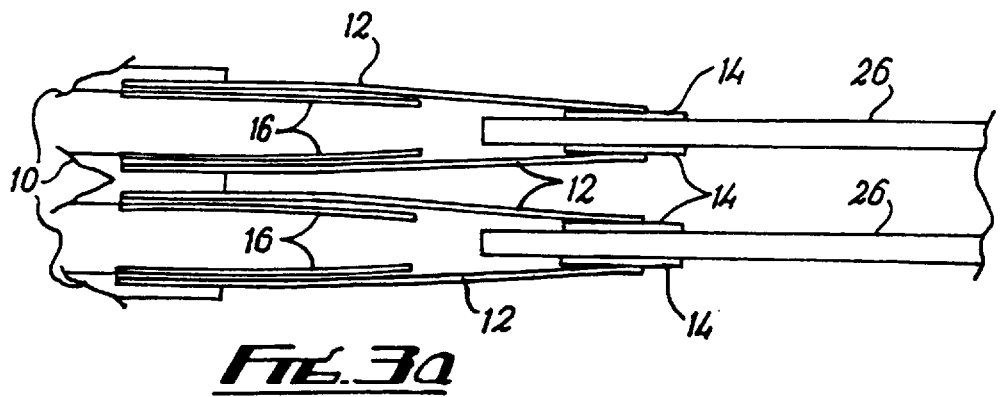
FIG. 3(a) is a schematic side view of the head assembly of a multi-platter disk drive in accordance with the invention with two disks present.
Figure 3B:
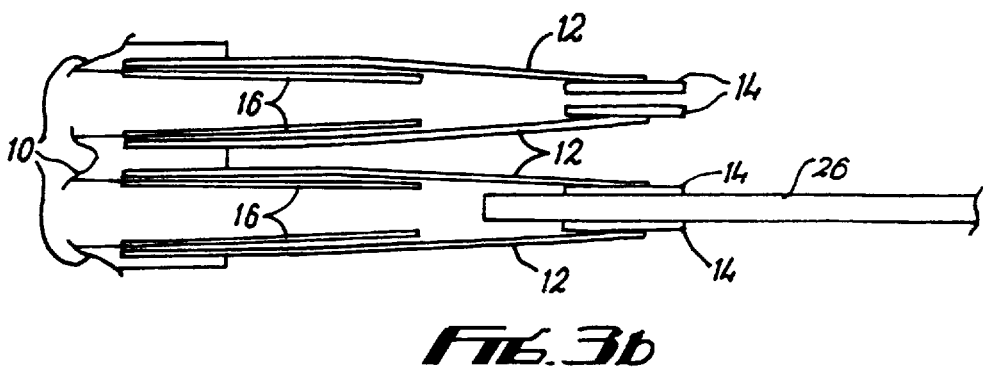
FIG. 3(b) is a schematic side view of the head assembly of a multi-platter disk drive in accordance with the invention with a single disk present.

The invention is equally applicable to multi-platter drives. FIG. 3 illustrates a twin-platter drive for use with a cartridge which may contain one or two disks. FIG. 3(a) shows the drive with both disks 26 present. FIG. 3(b) shows the drive with only a single disk present, the vertical movement of the upper pair of heads 14 where no disk is present being constrained by the limit stops 16.

Figure 4A:
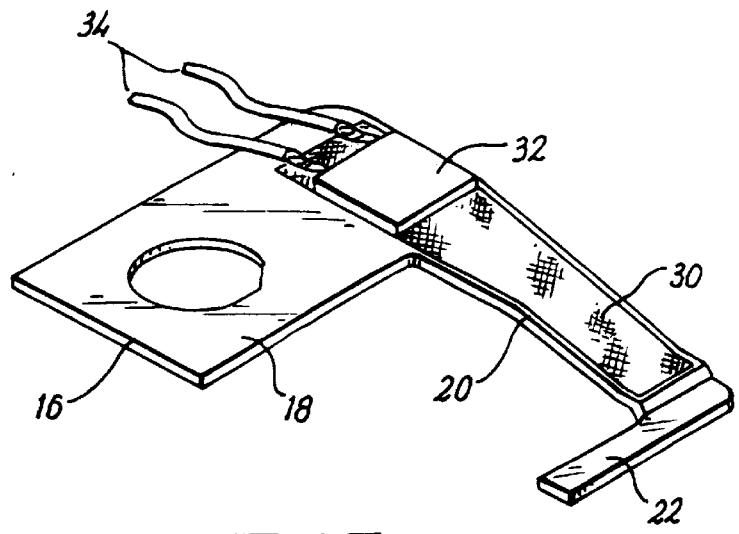
FIG. 4(a) is a perspective view of a limit stop member of a disk drive in accordance with the invention, incorporating a memory actuation element.
Figure 4B:
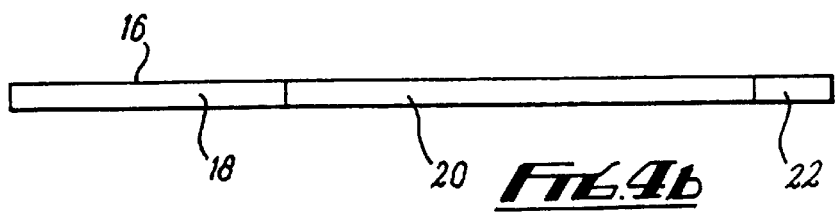
FIGS. 4(b) and 4(c) are, respectively, schematic side views of the limit stop member of FIG. 4(a) in a de-energised state and in an energised state respectively.
Figure 4C:
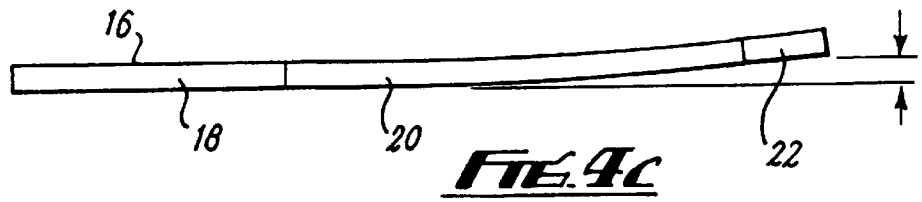

In accordance with the invention, the limit stops 16 may also incorporate memory actuation elements to provide lift for loading and unloading the heads. FIG. 4(a) shows a perspective view of a limit stop member 16 with memory actuation element comprising a layer of piezo ceramic material 30 deposited on its second limb 20, decode circuitry 32 superimposed on the piezo ceramic layer 30 and terminals 34 for energizing the element. The ceramic material is configured as a biomorph with two layers of material bonded together in opposite polarity. When a voltage is applied to the biomorph one layer expands and the other contracts, causing the biomorph to lift. The degree of lift is governed by the applied voltage and the force required. FIGS. 4(b) and 4(c) show the limit stop member with the memory actuation element in its de-energised and energised states respectively.

The biomorph might also be used as a strain gauge to detect resonant vibration of the suspension arm 12 and provide active damping through the application of a 180 degree phase-shifted signal. In this configuration, the biomorph would be applied directly to the suspension beam 12, rather than to the limit stop 16.

Figure 5:
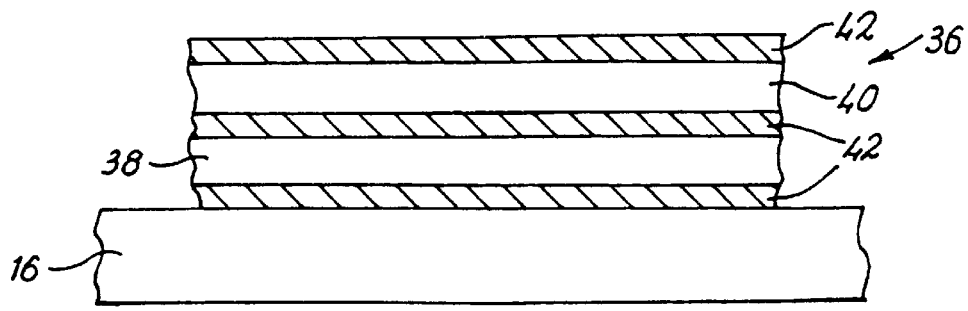
FIG. 5 is an enlarged, schematic side view of an embodiment of a limit stop member incorporating a memory actuation element in the form of a shape memory alloy (SMA) element.

As an alternative to piezo ceramic material, the memory actuation element may be provided by use of shape memory alloy (SMA) as illustrated in FIG. 5. The SMA element 36 may be constructed using conventional VLSI techniques, whereby the SMA is applied via chemical vapour deposition (CVD) onto a polyamide thin film layer. This process and subsequent conventional etch operations allows for the actuation element to be produced in a cost effective manner. The element 36 comprises a layer of SMA 38 (typically a 49:51 titanium nickel, TiNi, formulation), an ohmic heating layer 40 (suitably of nickel chromium, NiCr, alloy) and layers of insulation 42. The thin film construction of the element 36 allows for rapid actuation through rapid heat dissipation. After depositing the SMA layer the TiNi is pre-programmed into its memory parent shape by annealing the alloy, typically at 510° C. for one hour. After deposition, the TiNi is selectively etched to the required shape. Using this method it is possible to etch several discrete actuators in a single sheet.

By heating the SMA, a phase change (from the martensitic to austenitic) occurs, resulting in the memory shape being adopted. Actuation of the SMA is effected by energising the NiCr heating layer 40. NiCr has the advantage of having an excellent resistance versus temperature hysteresis characteristic, which allows the element to be controlled more precisely and reduces the input heat requirement and controlling effort. By applying a predetermined current through the ohmic heating element 40 it is possible to monitor the drop in potential and relate this to temperature. Since the ohmic layer is directly attached to the SMA 38 for thermal conduction (but not electrically), then the temperature of the SMA 38 and the level of actuation can be determined. This may be done by reference to a look-up table, with predefined hysteresis for the ohmic resistance versus temperature and the SMA deflection versus temperature hysteresis.

On cooling of the element the SMA returns to its martensitic state,

The full SMA element 36 will comprise several base layers and interlayers, some of which may act as the foundation for conductive paths, decode circuitry etc.

The use of a memory actuation element provides a reliable mechanism for head loading and unloading without the use of sliding, frictional ramps, with movement restricted predominantly to the z-height direction and with minimal head attitude biassing.

Improvements or modifications may be incorporated without departing from the scope of the invention.

I claim:

1. A disk drive comprising at least one read/write head mounted on a suspension arm, said suspension arm being mounted on an actuator arm whereby said read/write head may be translated parallel to a surface of a data storage disk, said suspension arm comprising a resilient member shaped such that said read/write head is biased towards said disk surface in a direction normal to said surface, wherein there is provided a limit stop member mounted on said actuator arm and adapted to limit the movement of said read/write head towards said disk surface; wherein said disk drive is a removable-cartridge-type hard disk drive adapted to receive interchangeable disk cartridges in which the thickness of the disk may vary from cartridge to cartridge; and wherein:

the arrangement of said limit stop member is such predetermined minimum value, the read/write head will contact the disk surface, in use, prior to said suspension arm contacting said limit stop member, whilst for disks having a thickness less than or equal to said predetermined minimum value, said suspension arm will contact said limit stop member prior to said read/write head contacting the disk surface.

2. A disk drive as claimed in claim 1, having a plurality of read/write heads mounted on a corresponding plurality of suspension arms, said suspension arms being mounted on a common actuator arm assembly and each having a limit stop member associated therewith.

3. A disk drive as claimed in claim 1, wherein said limit stop member comprises a generally planar, C-shaped member disposed in a plane generally parallel to said disk surface and having a first limb secured to said actuator arm, a second limb extending from one end of said first limb along one side of said suspension arm and a third limb extending from an end of said second limb remote from said first limb to overlie said suspension arm on the side thereof upon which said read/write head is mounted, said third limb being contacted by said suspension arm in the absence of a disk having a thickness greater than a predetermined is minimum value.

4. A disk drive as claimed in claim 1, wherein the disk drive includes a memory actuation element which can be energised so as to move the read/write head clear of the disk surface during head loading and unloading.

5. A disk drive as claimed in claim 4, wherein said memory actuation element comprises an element which is adapted to deform physically in response to an applied electric load or a change in temperature, such as a piezo ceramic element or shape memory alloy (SMA).

6. A disk drive as claimed in claim 4, wherein said memory actuation element is mounted on a surface of at least one of the limit stop member and the suspension arm such that, when energised, it deforms so as to force the suspension arm away from the disk surface.

7. A disk drive as claimed in claim 4 wherein:

said memory actuation element comprises a plurality of generally planar layers of material deposited on a surface of at least one of said suspension arm and said limit step member mounted on said actuator arm.

8. A disk drive as claimed in claim 7, wherein said memory actuation element comprises a piezo ceramic biomorph and means for applying a voltage to said piezo ceramic biomorph.

9. A disk dive as claimed in claim 7, wherein said memory actuation element comprises a shape memory alloy (SMA) element, said SMA element including a layer of SMA material, and ohmic heating layer, a plurality of insulating layers, and means for applying a voltage to said ohmic heating layer.

10. A disk drive comprising at least one read/write head mounted on a suspension arm, said suspension arm being mounted on an actuator arm whereby said read/write head may be translated parallel to a surface of a data storage disk, said suspension arm comprising a resilient member shaped such that said read/write head is biased towards said disk surface in a direction normal to said surface, wherein there is provided a limit stop member mounted on said actuator arm and adapted to limit the movement of said read/write head towards said disk surface; wherein said limit stop member comprises a generally planar, C-shaped member disposed in a plane generally parallel to said disk surface and having a first limb secured to said actuator arm, a second limb extending from one end of said first limb along one side of said suspension arm and a third, limb extending from an end of said second limb remote from said first limb to overlie said suspension arm on the side thereof upon which said read/write head is mounted, said third limb being contacted by said suspension arm in the absence of a disk having a thickness greater than a predetermined minimum value.

11. A disk drive as claimed in claim 10, having a plurality of read/write heads mounted on a corresponding plurality of suspension arms, said suspension arms being mounted on a common actuator arm assembly and each having a limit stop member associated therewith.

12. A disk drive as claimed in claim 10, wherein the disk drive includes a memory actuation element which can be energised so as to move the read/write head clear of the disk surface during head loading and unloading.

13. A disk drive as claimed in claim 12, wherein said memory actuation element comprises an element which is adapted to deform physically in response to an applied electric load or a change in temperature, such as a piezo ceramic element or shape memory alloy (SMA).

14. A disk drive as claimed in claim 12, wherein said memory actuation element is mounted on a surface of at least one of the limit stop member and the suspension arm such that, when energised, it deforms so as to force the suspension arm away from the disk surface.

15. A disk drive as claimed in claim 12, wherein:

said memory actuation element comprises a plurality of generally planar layers of material deposited on a surface of at least one of said suspension arm and said limit stop member mounted on said actuator arm.

16. A disk drive as claimed in claim 15, wherein said memory actuation element comprises a piezo ceramic biomorph and means for applying a voltage to said piezo ceramic biomorph.

17. A disk drive as claimed in claim 15, wherein said memory actuation element comprises a shape memory alloy (SMA) element, said SMA element including a layer of SMA material, an ohmic hearing layer, a plurality of insulating layers, and means for applying a voltage to said ohmic heating layer.

* * * * *

UNITED STATES PATENT AND TRADEMARK OFFICE
CERTIFICATE OF CORRECTION

PATENT NO. : 5,808,837
DATED : September 15, 1998
INVENTOR(S) : Norton

It is certified that error appears in the above-identified patent and that said Letters Patent is hereby corrected as shown below:

Col 5, Line 66:
that, for disks having a thickness greater than a predetermined minimum value, the read/write head Col 6, Line 21:
thickness greater than a predetermined minimum value.

Col 6, Line 40:
limit stop member mounted on said actuator arm

Col 6, Line 48:
material, an ohmic heating layer, a plurality of insulating

Col 8, Line 17:
SMA material, an ohmic heating layer, a plurality of insu-

Signed and Sealed this

Twelfth Day of January, 1999

Attest:

Attesting Officer

*Acting Commissioner of Patents and Trademarks*